United States Patent
Beauvais

(10) Patent No.: US 10,293,799 B2
(45) Date of Patent: May 21, 2019

(54) METHODS FOR TRANSITIONING INTO REDUCED BRAKING PERFORMANCE MODES UPON FAILURE OF A PRIMARY BRAKING SYSTEM

(71) Applicant: FORD GLOBAL TECHNOLOGIES, LLC, Dearborn, MI (US)

(72) Inventor: Brandon Beauvais, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 78 days.

(21) Appl. No.: 15/223,637

(22) Filed: Jul. 29, 2016

(65) Prior Publication Data
US 2018/0029577 A1 Feb. 1, 2018

(51) Int. Cl.
| | |
|---|---|
| *B60T 8/176* | (2006.01) |
| *B60T 8/96* | (2006.01) |
| *B60T 7/06* | (2006.01) |
| *B60T 8/171* | (2006.01) |
| *B60T 8/1761* | (2006.01) |
| *B60T 7/04* | (2006.01) |
| *B60T 17/18* | (2006.01) |

(52) U.S. Cl.
CPC ............... *B60T 8/96* (2013.01); *B60T 7/042* (2013.01); *B60T 7/06* (2013.01); *B60T 8/171* (2013.01); *B60T 8/176* (2013.01); *B60T 8/1761* (2013.01); *B60T 17/18* (2013.01); *B60T 2260/04* (2013.01); *B60T 2270/402* (2013.01)

(58) Field of Classification Search
CPC ........................... B60T 8/1761; B60T 2260/04
See application file for complete search history.

(56) References Cited

U.S. PATENT DOCUMENTS

| | | |
|---|---|---|
| 4,057,296 A | 11/1977 | Oka et al. |
| 4,586,591 A | 5/1986 | Belart |
| 4,629,043 A | 12/1986 | Matsuo et al. |

(Continued)

FOREIGN PATENT DOCUMENTS

| | | | |
|---|---|---|---|
| CN | 104309597 A | | 1/2015 |
| JP | 2016124409 A | * | 7/2016 |

(Continued)

OTHER PUBLICATIONS

Machine translation of JP-2016124409 (no date).*

(Continued)

*Primary Examiner* — Nicholas J Lane
(74) *Attorney, Agent, or Firm* — Jones Robb, PLLC; Raymond Coppiellie

(57) ABSTRACT

Methods for transitioning a braking system between primary and fallback modes are provided. A method in accordance with the present disclosure may include identifying a failure in the functionality of the primary braking system, and, upon identifying the failure, mitigating an abrupt increase in a pedal travel distance required to brake or otherwise decelerate the vehicle so as to provide smooth transition from a primary braking mode to a fallback braking mode. The mitigating the increase in the pedal travel distance may include initiating a transition to the fallback braking mode, activating at least one of a plurality of transition braking modes, and gradually increasing the pedal travel distance by deactivating at least one of the previously activated transition braking modes.

21 Claims, 6 Drawing Sheets

(56) References Cited

U.S. PATENT DOCUMENTS

| | | |
|---|---|---|
| 5,139,315 A | 8/1992 | Walenty et al. |
| 6,354,672 B1 | 3/2002 | Nakamura et al. |
| 6,406,102 B1 * | 6/2002 | Arnold .................... B60T 7/042 303/20 |
| 6,450,591 B1 | 9/2002 | Kawahata et al. |
| 6,476,515 B1 | 11/2002 | Yamamoto et al. |
| 6,582,030 B2 | 6/2003 | Harris |
| 6,598,943 B2 | 7/2003 | Harris |
| 6,817,681 B2 | 11/2004 | Fey et al. |
| 8,807,668 B2 | 8/2014 | Koshimizu et al. |
| 8,924,105 B1 * | 12/2014 | Miesterfeld ............... B60T 8/17 477/115 |
| 2002/0109403 A1 | 8/2002 | Yamamoto et al. |
| 2004/0075337 A1 | 4/2004 | Giers et al. |
| 2004/0100146 A1 | 5/2004 | Giers et al. |
| 2004/0140710 A1 * | 7/2004 | Alvarez .................. B60T 7/042 303/20 |
| 2005/0168064 A1 | 8/2005 | McCann |
| 2006/0019737 A1 | 1/2006 | Yang |
| 2006/0113158 A1 * | 6/2006 | Popp ....................... B60T 8/885 192/220 |
| 2008/0106142 A1 | 5/2008 | Nishino et al. |
| 2010/0105520 A1 * | 4/2010 | Ohbayashi ............... B60K 6/48 477/23 |
| 2011/0005874 A1 | 1/2011 | Beier et al. |
| 2013/0147259 A1 | 6/2013 | Linkenbach et al. |
| 2014/0015310 A1 | 1/2014 | Hanzawa et al. |
| 2015/0266457 A1 * | 9/2015 | Johnson .................. B60T 7/042 303/15 |
| 2017/0166173 A1 * | 6/2017 | Lauffer .................... B60T 8/17 |

FOREIGN PATENT DOCUMENTS

| | | |
|---|---|---|
| WO | 0234562 A1 | 5/2002 |
| WO | 2004000618 A1 | 12/2003 |
| WO | 2011039558 A1 | 4/2011 |

OTHER PUBLICATIONS

Non-Final Office Action in co-pending U.S. Appl. No. 14/223,472, dated Apr. 9, 2015.
Final Office Action in co-pending U.S. Appl. No. 14/223,472, dated Oct. 6, 2015.
Advisory Action in co-pending U.S. Appl. No. 14/223,472, dated Feb. 11, 2016.
Non-Final Office Action in co-pending U.S. Appl. No. 14/223,472, dated Jul. 5, 2016.
Final Office Action in co-pending U.S. Appl. No. 14/223,472, dated Nov. 18, 2016.
Advisory Action in co-pending U.S. Appl. No. 14/223,472, dated Feb. 7, 2017.
Non-Final Office Action in co-pending U.S. Appl. No. 14/223,472, dated Aug. 31, 2017.

* cited by examiner

METHODS FOR TRANSITIONING INTO REDUCED BRAKING PERFORMANCE MODES UPON FAILURE OF A PRIMARY BRAKING SYSTEM

TECHNICAL FIELD

Aspects of the present disclosure relate generally to methods for transitioning into reduced braking performance modes upon failure of a primary braking system. More particularly, aspects of the present disclosure relate to methods for providing a smooth transition into a fallback braking mode upon failure of a primary braking system of an automotive vehicle.

BACKGROUND

Brake systems for a vehicle often rely on hydraulic fluid to transfer force into torque at the wheels of the vehicle. The force transmitted via hydraulic fluid may be generated directly from pressure imparted on a pedal by a driver's foot. Alternatively, the force transmitted via hydraulic fluid may be generated from, and/or multiplied by, a semi-connected or fully-connected actuator. The actuator may be mechanical (e.g., a vacuum booster) or electrical (e.g., an electric motor).

Upon failure of the hydraulic fluid transfer system (e.g., leak or valve malfunction) or failure of the force generation and/or multiplication means, brake systems can be designed to have a fallback braking mode. Generally, a fallback braking mode is fully actuated by the driver's foot to apply counter-propulsive torque at the wheels of the vehicle.

From the driver's perspective, fallback braking modes generally feel vastly different than the primary braking mode of the vehicle. Primary braking modes call for shorter pedal travel and lower input force than what is generally required in a fallback mode. Primary braking modes also provide a higher vehicle deceleration than fallback modes generally offer. In a fallback mode, a brake pedal has a longer travel and a "spongy" feel for the driver such that pedal depression can seem to have no impact on the deceleration of the vehicle until considerable pedal travel distance and force have been applied. Thus, in the event of a primary brake system failure, the sudden change to a fallback mode results in a potentially frightening situation for the driver as the brake pedal assumes unfamiliar performance characteristics. A driver may interpret the change to a fallback mode as a complete loss of braking power and as a result may not push far and/or hard enough on the brake pedal to impart any counter-propulsive torque whatsoever.

Therefore, it may be desirable to provide a less abrupt transition to a full fallback braking mode in the event of failure of the primary braking system. Further, it may be desirable to transition to at least one intermediate backup braking mode that has a shorter pedal travel and provides a stiffer pedal feel than a final, full fallback braking mode. Further, it may be desirable to provide a smooth and/or multi-phase transition to a final fallback braking mode in the event of failure of the primary braking system.

SUMMARY

Exemplary embodiments of the present disclosure may solve one or more of the above-mentioned problems and/or may demonstrate one or more of the above-mentioned desirable features. Other features and/or advantages may become apparent from the description that follows.

In accordance with various exemplary embodiments of the present disclosure, a method for transitioning a braking system between primary and fallback modes is provided. The method includes reducing a working volume of a primary braking system so that hydraulic braking energy is supplied to wheels of an axle of a vehicle, and, based upon a speed of the vehicle, selecting a source of braking energy to be supplied to wheels of another axle of the vehicle by an electronic parking brake.

In accordance with another aspect of the present disclosure, another method for transitioning a braking system of a vehicle between primary and fallback modes is provided. The method includes identifying a failure in the functionality of the primary braking system, and, upon identifying the failure, mitigating an abrupt increase in a pedal travel distance required to brake or otherwise decelerate the vehicle so as to provide smooth transition from a primary braking mode to a fallback braking mode. The mitigating the increase in the pedal travel distance includes initiating a transition to the fallback braking mode, activating at least one of a plurality of transition braking modes, and gradually increasing the pedal travel distance by deactivating at least one of the previously activated transition braking modes.

Additional objects and advantages will be set forth in part in the description which follows, and in part will be obvious from the description, or may be learned by practice of the present disclosure and/or claims. At least some of these objects and advantages of the present disclosure may be realized and attained by means of the elements and combinations particularly pointed out in the appended claims.

It is to be understood that both the foregoing general description and the following detailed description are exemplary and explanatory only and are not restrictive of the claimed subject matter; rather the claims should be entitled to their full breadth of scope, including equivalents. The accompanying drawings, which are incorporated in and constitute part of this specification, illustrate exemplary embodiments of the present disclosure and together with the description, serve to explain principles of the present teachings.

BRIEF DESCRIPTION OF THE DRAWINGS

At least some features and advantages of the present teachings will be apparent from the following detailed description of exemplary embodiments consistent therewith, which description should be considered with reference to the accompanying drawings, wherein.

Figure 1:
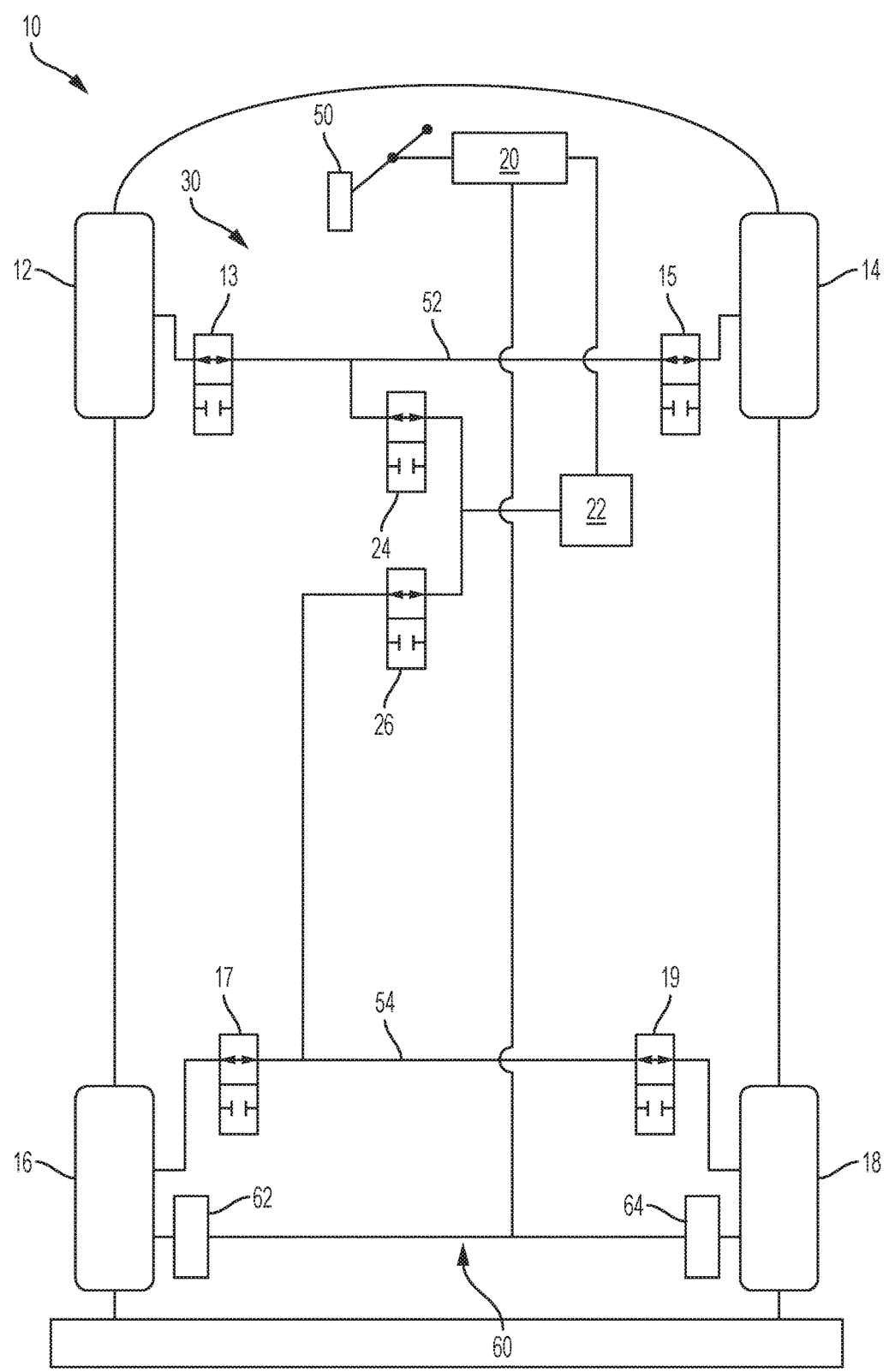
FIG. 1 is a schematic bottom view of a vehicle, according to an exemplary embodiment of the present teachings.

Although the following detailed description makes reference to exemplary illustrative embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various exemplary embodiments, examples of which are illustrated in the accompanying drawings. The various exemplary embodiments are not intended to limit the disclosure. To the contrary, the disclosure is intended to cover alternatives, modifications, and equivalents of the exemplary embodiments. In the drawings and the description, similar elements are provided with similar reference numerals. It is to be noted that the features explained individually in the description can be mutually combined in any technically expedient manner and disclose additional embodiments of the present disclosure. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

The present disclosure contemplates various methods for transitioning between a primary braking mode and fallback braking modes (i.e., reduced braking performance modes upon a failure within a primary braking system). In accordance with the present disclosure, a braking system of a vehicle may include a primary braking system and a backup braking system. The backup braking system may be configured to select a backup braking mode based on a functional state of the primary braking system, the motion of the vehicle, brake pedal travel, and/or the duration of time that has passed since the failure within the primary system was initially detected. The primary braking system may be, for example, a brake-by-wire system or a mechanical push-through braking system.

The braking system also may include a parking brake system. The parking brake system may be, for example, a mechanical parking brake system or an electronic parking brake system. A parking brake system may be configured to be actuated in various manners, for example, via a simple switch (e.g., hand lever) or via an electronic switch (e.g., electronic hand lever) operatively connected to a sensor such as an angle sensor. The parking brake system may supplement the primary braking system and/or the backup braking system, as described herein.

Various embodiments of a method for transitioning a braking system between primary and fallback modes in accordance with the present disclosure can include reducing a working volume of a primary braking system so that hydraulic braking energy is supplied to wheels of a single axle of the vehicle, and selecting a source of braking energy to be supplied to wheels of another axle of the vehicle by an electronic parking brake. A speed of the vehicle may provide the basis for determining the source of braking energy to be supplied to wheels of another axle of the vehicle by an electronic parking brake. When a determined speed of the vehicle is above a threshold speed, a source of braking energy to be supplied to wheels of another axle of the vehicle by an electronic parking brake may include supplying braking energy via antilock braking. In the event that a determined speed of the vehicle is below a threshold speed, a source of braking energy to be supplied to wheels of another axle of the vehicle by an electronic parking brake may include supplying braking energy via dynamic clamping in a slip dependent manner.

In addition to supplemental braking provided by a parking brake system, in various embodiments of a method for transitioning a braking system between primary and fallback modes in accordance with the present disclosure, other sources of counter-propulsive torque may be engaged, such as, for example, engine braking, transmission braking, adding engine loads, and/or shifting the vehicle into reverse or park. as described herein. In the event of a failure of the primary braking system, by selectively modifying the primary braking system and activating various sources of braking/counter propulsive torque described herein, a smooth transition to a full fallback braking mode can be achieved. A driver of a vehicle may observe such a smoother transition by experiencing a stiffer pedal feel throughout the transition to a final, full fallback braking mode.

Turning to FIG. 1, a schematic bottom view of an exemplary embodiment of a vehicle 10 is shown, which includes a left-front wheel 12, a right-front wheel 14, a left-rear wheel 16, and a right-rear wheel 18. As depicted in the exemplary embodiment of FIG. 1, vehicle 10 may be an automobile, such as, for example, a passenger car. However, the various exemplary embodiments described herein may be used in other types of automobiles and other types of vehicles familiar to one skilled in the art, such as, for example, work vehicles, construction vehicles, and other vehicles one skilled in the art is familiar with.

Vehicle 10 may include a primary braking system 30 to slow and/or stop rotation of wheels 12, 14, 16, and 18. According to an exemplary embodiment, primary braking system may be a brake-by-wire braking system that communicates with electronically controlled valves to supply hydraulic fluid to braking devices associated with wheels 12, 14, 16, and 18. For example, primary braking system 30 may include a controller 20 and a pressure source 22 in communication with wheel inlet valves 13, 15, 17, and 19, respectively, which are configured to supply hydraulic fluid to braking devices (not shown) of wheels 12, 14, 16, and 18. Controller 20 may be in communication with brake pedal 50 such that the force applied to the brake pedal 50 and/or the distance traveled by the brake pedal 50 upon depression by a driver is detected and/or received by the controller 20 via a mechanical and/or electrical connection. The controller 20 may use the input(s) communicated from the brake pedal to dictate the function of at least the pressure source 22 and the wheel inlet valves 13, 15, 17, and 19. Pressure source 22 may be, for example, an electric brake booster, vacuum booster, a pressure reservoir, a piston-cylinder, a pump, or other device familiar to one of ordinary skill in the art for providing pressure for a braking system. An electric brake boost device compatible with the methods of the present disclosure may include a ball screw mechanism to move a piston in a chamber. Wheel inlet valves 13, 15, 17, and 19 may be dynamically controllable and a part of an anti-lock braking (ABS) system and/or electronic speed control (ESC) system, therefore, the valves 13, 15, 17, and 19 may be incorporated into methods for transitioning into a fallback braking mode of the present disclosure without incurring significant additional cost or complexity to the overall braking system of the vehicle 10 because the vehicle 10 already includes an ABS and/or ESC system.

According to an exemplary embodiment, the primary braking system 30 may include valves in communication with brake lines in communication with wheel inlet valves 13, 15, 17, and 19. For example, the primary braking system 30 may include a first primary pressure supply valve 24 in communication with a first brake line 52 communicating with wheel inlet valve 13 for left-front wheel 12 and wheel inlet valve 15 for right-front wheel 14, and a second primary pressure supply valve 26 in communication with a second brake line 54 communicating with wheel inlet valve 17 for left-rear wheel 16 and wheel inlet valve 19 for right-rear wheel 18, such as when brake lines 52, 54 have a front-rear split configuration, as shown in the exemplary embodiment of FIG. 1. However, brake lines 52, 54 are not limited to a front-rear split configuration and may have other configurations, such as, for example, a diagonal-split (i.e., one brake line is in communication with the left-front wheel and the right-rear wheel, and the other brake line is in communication with the right-front wheel and the left-rear wheel) or other configurations that one skilled in the art is familiar with.

Braking devices (not shown) of wheels 12, 14, 16, and 18 may include, for example, a brake caliper with a piston that engages a brake pad against a rotor of a wheel, according to an exemplary embodiment. Alternatively, according to various other exemplary embodiments, braking devices (not shown) of wheels 12, 14, 16, and 18 may include a wedge brake system that includes a brake pad connected to a wedge, the brake pad being configured to be pushed between a brake caliper and a brake rotor via electronic motor(s). In yet other alternative exemplary embodiments, braking devices (not shown) of wheels 12, 14, 16, and 18 may be drum brakes, In still other alternative exemplary embodiments, braking devices (not shown) of wheels 12, 14, 16, and 18 may be devices configured to apply counter-propulsive force via means other than friction, such as, for example, regenerative braking via electric motors that deliver stored chemical energy or regenerative braking via flywheels that deliver stored kinetic energy. The braking system may include other components not shown in FIG. 1, which may have been omitted for clarity. For example, overall braking system may include other components one skilled in the art would be familiar with, such as, for example, pumps, pressure reservoirs, hydraulic pistons, brake outlet valves, and fluid returns.

When performance of pressure source 22 is reduced (e.g., the ability to boost brakes is reduced or lost), a transition to a fallback braking mode may be initiated. A sensor (not shown) may detect when the reduction in braking performance capability occurs and trigger the initiation of a transition to a fallback braking mode. In other exemplary embodiments, a sensor detects the loss of ability to boost brakes during the first depression of the brake pedal 50 after a brake boosting failure occurs, thus the trigger occurs once the brake pedal 50 has been at least partially depressed by the driver. A sensor in this type of system may be an electric motor sensor that is configured to detect a lack of motor movement after a target pressure is requested in accordance with a pedal depression. Also, two sensors may be configured to detect when pedal depression or other driver movement creates pressure in one chamber of the brake system, but the generation of pressure in accordance with a subsequent request for pressure fails to occur in another chamber of the brake system. Furthermore, in various exemplary embodiments according to the present disclosure, a sensor may detect when a current draw of a phase current or field-effect transistor (FET) current is outside of a range corresponding to the expected current draw of the level of request received, from which a stuck actuator may be inferred.

In some other exemplary embodiments, the sensor may be capable of continuously monitoring the pressure source 22 such that the transition is initiated nearly instantaneously upon the loss of brake boosting ability and before any pressure is applied to the brake pedal 50 by the driver. A sensor in this type of system may, for example, be a brake fluid switch that detects when the hydraulic fluid reservoir is drained or a sensor that detects when a complete loss of communication with a brake module occurs, which can indicate complete failure of the primary brake system. In these scenarios, If the controller for detecting driver input(s) is internal to the brake module that has failed, the indications representing driver input(s) (e.g., pedal travel) will not have high resolution. In event of this, the output of a brake on-off (BOO) switch, generally used for cruise control cancellation and stop lamp activation, can be used as a switch that also initiates the transition to a fallback braking mode according to the present disclosure. Upon receiving an indication that brake boosting ability has been lost, initiation of a transition to a fallback braking mode may occur or, confirmation that the braking is not actually occurring may be made prior to such initiation by looking to the output of a longitudinal acceleration sensor to observe whether an appreciable increase in deceleration coinciding with the activation of the BOO switch has or has not occurred.

When fully functional, the controller 20 may direct the primary braking system 30 to supply hydraulic fluid to braking devices of all wheels of the vehicle. In the exemplary embodiment of FIG. 1, primary pressure supply valves 24, 26 and wheel inlet vales 13, 15, 17, and 19 are shown in an open state to represent a fully functional state of the primary braking system 30.

Figure 2:
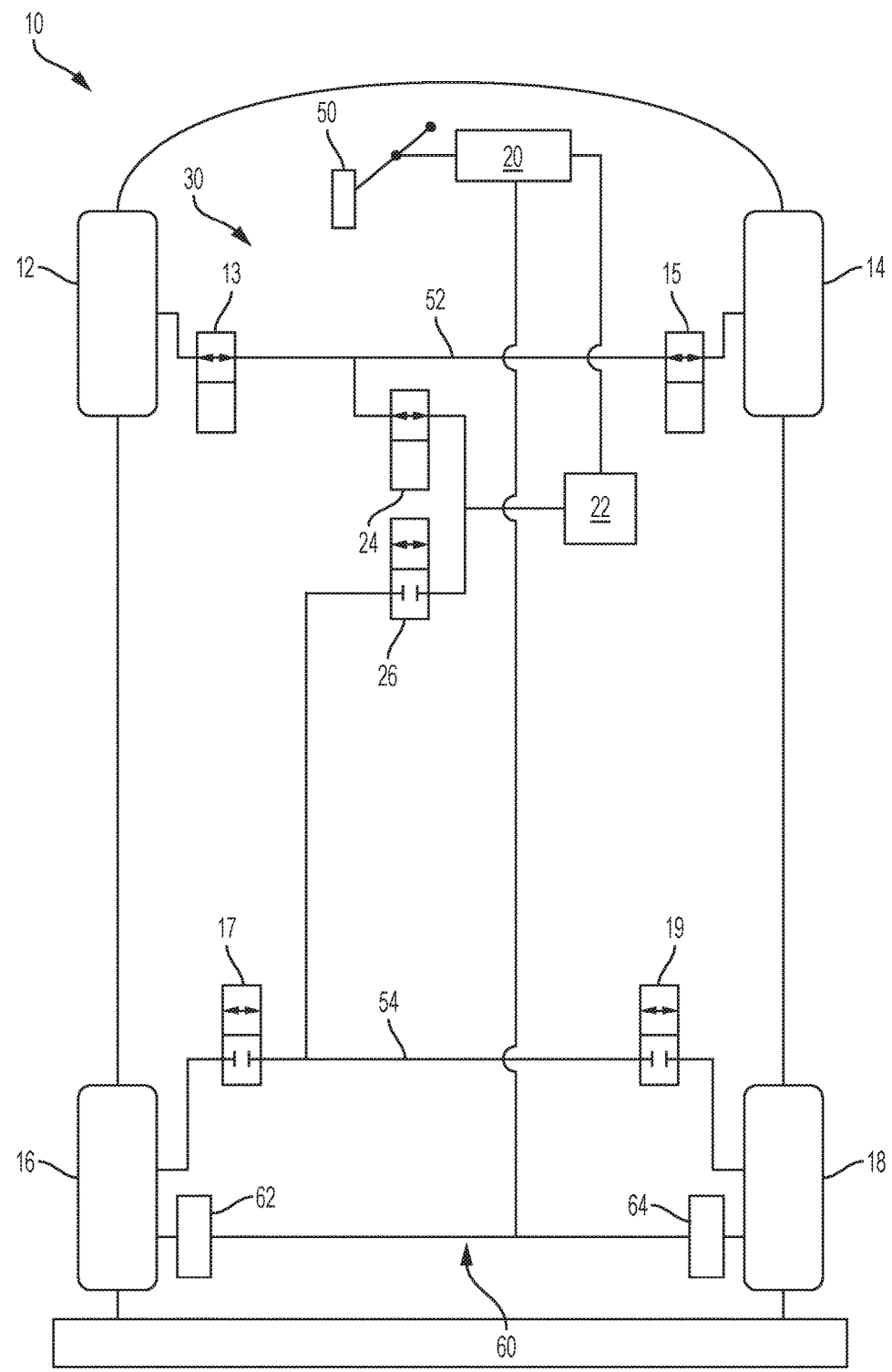
FIG. 2 is a schematic bottom view of a vehicle when a primary braking system is partially functional and a transition to a fallback braking mode has been initiated, according to an exemplary embodiment of the present teachings.

Upon the detection of a fault in the primary braking system 30, for example a brake booster failure as described above, controller 20 may close valves in order to reduce the working volume of the overall brake system. Turning to FIG. 2, a schematic bottom view of an exemplary embodiment of the vehicle 10 is shown with an exemplary configuration of the braking system in an initial state after the ability to boost brakes has been lost and the transition to a fallback braking mode has been initiated. Controller 20 may have control over primary pressure supply valves 24 and 26, and including wheel inlet valves 13, 15, 17, and 19. Thus, upon detection of a brake booster failure, the controller 20 may, for example, close primary supply valve 26 and rear wheel inlet valves 17 and 19 so that all of the fluid pressure that the primary braking system is able to generate while the brake booster is non-functional goes to the braking devices for the front wheels 12 and 14. Reducing the working volume of the overall brake system in this way at an initial stage of the transition to a fallback braking mode provides brake pedal 50 with a shortened pedal travel and a stiffer responsiveness at low pedal travel distances (i.e., a higher force-to-travel relationship). Thus, at the initial stage of the transition to a fallback braking mode, the pedal feel of the brake pedal 50 can be maintained closer to the pedal feel of the brake pedal 50 during a normal braking mode (i.e., when the primary braking system is fully functional). Alternative to the above (but not shown), the foundation brakes of the rear wheels 16 and 18 may be isolated from receiving hydraulic fluid pressure by closing only the wheel inlet valves 17 and 19 or by only closing the primary supply valve 26.

Although the exemplary embodiment of FIG. 2 depicts the braking system being configured to provide hydraulic braking fluid pressure to the braking devices of front wheels 12 and 14 while isolating the braking devices of rear wheels 16 and 18 in the initial stage of the transition to a fallback braking mode, the braking system is not limited to this configuration. For example, the braking system may provide hydraulic braking fluid to the braking devices of the rear wheels 16 and 18 while isolating the braking devices of the front wheels 12 and 14 in the initial stage of the transition to a fallback braking mode.

To provide additional braking energy in the event that a transition to a fallback braking mode is initiated by a detected failure of the primary braking system, a parking brake system 60 of vehicle 10 may be used to brake one or more wheels of vehicle 10, as shown in FIGS. 1 and 2. Parking brake system 60 may be, for example, an electric parking brake, according to an exemplary embodiment. As shown in the exemplary embodiment of FIG. 2, parking brake system 60 may communicate with parking brake devices 62 and 64 of rear wheels 16 and 18 that apply braking energy to rear wheels 16 and 18 to slow and/or stop rotation of rear wheels 16 and 18. As a result, parking brake system 60 may be used to provide additional braking energy as part of a transition to a fallback braking mode without incurring significant additional cost or complexity to the braking system of vehicle 10 because vehicle 10 already includes parking brake 60.

According to an exemplary embodiment, when controller 20 closes primary pressure supply valve 26 and wheel inlet valves 17 and 19 for rear wheels 16 and 18 so that brake fluid pressure is only supplied to foundation brakes of front wheels 12 and 14, parking brake system 60 may be used to provide additional braking energy, as shown in the exemplary embodiment of FIG. 2. Parking brake system 60 may be used to slow and/or stop rear wheels 16 and 18. In other words, the hydraulic pressure from pressure source 22 may be directed to only the wheels of a single axle, such as, for example, a front axle, while a parking brake applies braking energy to the wheels of another single axle, such as, for example a rear axle. Thus, an initial stage of a transition to a fallback braking mode may provide a pedal feel of the brake pedal 50 that is closer to the pedal feel of the brake pedal 50 during a normal braking mode (i.e., when the primary braking system is fully functional) and provide a driver with a more confident feeling regarding braking. The absence of hydraulic pressure applied to rear wheels 16 and 18 may also allow parking brake 60 to operate with a higher amount of torque because the risk of vehicle instability may be minimized by using a wheel-slip control system.

In one exemplary embodiment, the initial stage of the transition to a fallback braking mode involves simultaneously supplying hydraulic fluid pressure to the braking devices of the front wheels 12, 14 and actuating the parking brake to only apply braking energy to the rear wheels 16, 18. In another exemplary embodiment, the initial stage of the transition to a fallback braking mode involves supplying the hydraulic fluid pressure to the braking devices of the front wheels 12, 14, waiting a period of time, and then actuating the parking brake to apply braking energy to the rear wheels 16, 18. For example, actuation of the parking brake assistance may be delayed until the amount of force applied to the brake pedal 50 by the driver, as measured by a sensor in communication with the brake controller 20, reaches a threshold amount of force. Delaying application of the parking brake energy to the rear wheels is an accommodation for the facts that EPBs have higher efficacy relative to the limited pressure being provided to the front wheels and that current EPBs have relatively unrefined and unresponsive control. Accordingly, the incorporation of a delay is to allow for sufficient braking to occur at the front wheels 12, 14 before applying parking brake energy to the rear wheels 16, 18 so that any vehicle instability that may occur upon application of the parking brake can be diminished. In another exemplary embodiment, actuation of the parking brake assistance may be delayed until the speed of the vehicle 10 is reduced to a specific threshold via other means for decelerating the vehicle.

According to an exemplary embodiment, parking brake system 60 may be in communication with and controlled by brake controller 20 (e.g., an integrated electronic parking brake (iEPB)), although parking brake system 60 may be instead controlled by a separate controller in communication with brake controller 20. If controlled by a separate controller, the brake on-off (BOO) switch can trigger actuation of the parking brake system in the event of a failure within the brake controller 20. Further, parking brake devices 62 and 64 may be, for example, brake devices actuated by electric motors. For example, parking brake devices 62 and 64 may be screw devices to apply pressure to brake calipers of vehicle wheels, with the screw devices being actuated by electric motors driven by an electric current controlled by controller 20.

Although the exemplary embodiment of FIG. 2 depicts the braking system being configured to provide hydraulic braking fluid pressure to the foundation brakes of front wheels 12, 14 and braking energy from parking brake system 60 to rear wheels 16 and 18 in the initial stage of the transition to a fallback braking mode, the braking system is not limited to this configuration. For example, parking brake system 60 may provide braking energy to front wheels 12 and 14 and hydraulic braking fluid pressure may be applied to the foundation brakes of rear wheels 16 and 18 in the initial stage of the transition to a fallback braking mode.

Parking brake systems of the exemplary embodiments described herein, such as parking brake systems 60 of the exemplary embodiments of FIGS. 1 and 2, may utilize proportional braking. Thus, instead of using a single, predetermined braking force to slow and/or stop the wheels of a vehicle, the braking force is proportional to the amount of pedal depression made by a driver to a pedal. As a result, a driver may feel that the vehicle is braking in a manner corresponding to the amount of pedal depression, even when braking is achieved by a braking mode using the parking brake in a proportional manner.

According to an exemplary embodiment, when a parking brake system is an electric parking brake, the parking brake system may receive use signals from a brake pedal and/or sensors to determine the amount of pedal depression by a driver and use the signals to control the parking brake proportionally to the amount of pedal depression. In the exemplary embodiments of FIG. 2, brake controller 20 may receive signals from the brake pedal and/or sensors to determine the amount of pedal depression and then control parking brake devices 62, 64 in a proportional manner. For example, when parking brake devices 62, 64 are devices actuated by electric motors, such as screw devices to apply pressure to a brake caliper of a wheel, brake controller 20 may control the amount of current supplied to the electric motors actuating parking brake devices 62, 64 so the parking brake applies braking energy in a manner proportional to the amount of pedal depression. Whether or not current is supplied to the electric motors actuating parking brake devices 62, 64 may be determined based on whether a threshold for the current drawn to the electric motors actuating has been eclipsed (if eclipsed, application of the EPB can be ceased or reduced). The threshold current draw may correspond to the amount of current that is drawn when the EPB is fully applied and the electric motor is stalled or near stalling. In another exemplary embodiment, the parking brake energy may be applied in proportion to the duration of the application of the parking brake. Moreover, a parking brake system may be configured to apply braking energy at multiple stages according to position pre-programmed in the electric motors that actuate the parking brake devices 62, 64.

According to an exemplary embodiment, a parking brake system may be controlled to utilize anti-lock braking (ABS). For example, when parking brake system 60 of the exemplary embodiments of FIGS. 1 and 2 are used in a transition to a fallback braking mode, brake controller 20 may receive signals from wheel speed sensors, such as wheel speed sensors for rear wheels 16, 18 to indicate whether a wheel has locked. When a wheel speed signal indicates that a wheel has locked, brake controller 20 may control parking brake devices 62, 64 to apply less force, such as by reducing a current supplied to motors actuating parking brake devices 62, 64, so that a wheel unlocks. According to an exemplary embodiment, a park brake system may be controlled to use ABS when also implementing proportional braking, as described above.

As described above, when a primary braking system becomes either fully or partially non-functional, a transition to a fallback braking mode may be initiated to slow and/or stop rotation of the wheels of the vehicle. A primary braking system may become fully non-functional (i.e., the ability to provide any hydraulic fluid pressure to the braking devices is lost completely, for example, because of a brake controller failure or a complete loss of hydraulic braking fluid) or only partially functional (i.e., the ability to provide hydraulic fluid pressure to the braking devices is reduced, for example, because one or more aspects of the primary braking system, such as a pressure source's ability to boost the braking force, has failed). In view of this, an overall braking system may be configured to selectively actuate different transitional braking modes prior to selecting a fallback braking mode according to the functional state of the primary braking system so that the transition may be efficiently conducted.

In accordance with an exemplary embodiment of the present teachings, a controller of a braking system of vehicle may be configured to select a transitional braking mode prior to selecting a fallback braking mode based on the functional state of the primary braking system. For example, brake controller 20 of primary braking system may function as a controller to determine if the primary braking system is partially functional and determine a transitional braking mode prior to bringing the braking system into a final fallback braking mode. Controller 20 may be in communication with pressure source 22, primary pressure supply valves 24 and 26, and wheel inlet valves 13, 15, 17, 19 so that controller 20 may be able to determine the functional status of these components. For example, controller 20 may receive signals from pressure source 22, primary pressure supply valves 24 and 26, and/or wheel inlet valves 13, 15, 17, 19 indicating the functional status of each component. In another example, the absence of a signal from pressure source 22, primary pressure supply valves 24 and 26, and/or wheel inlet valves 13, 15, 17, 19 can indicate the functional status of each component (e.g., that the component is non-functional). After determining the functional status of pressure source 22, primary pressure supply valves 24 and/or 26, and/or wheel inlet valves 13, 15, 17, 19, controller 21 may select a functional state of the overall braking system when primary braking system is at least partially functional.

If the various components are all functional, controller 20 may control primary braking system in a normal state, such as without the initiation of any of the transitional braking modes. Otherwise, if primary braking system is either partially or fully non-functional, a transitional braking mode prior to a fallback braking mode may be initiated by the controller 20.

Figure 3:
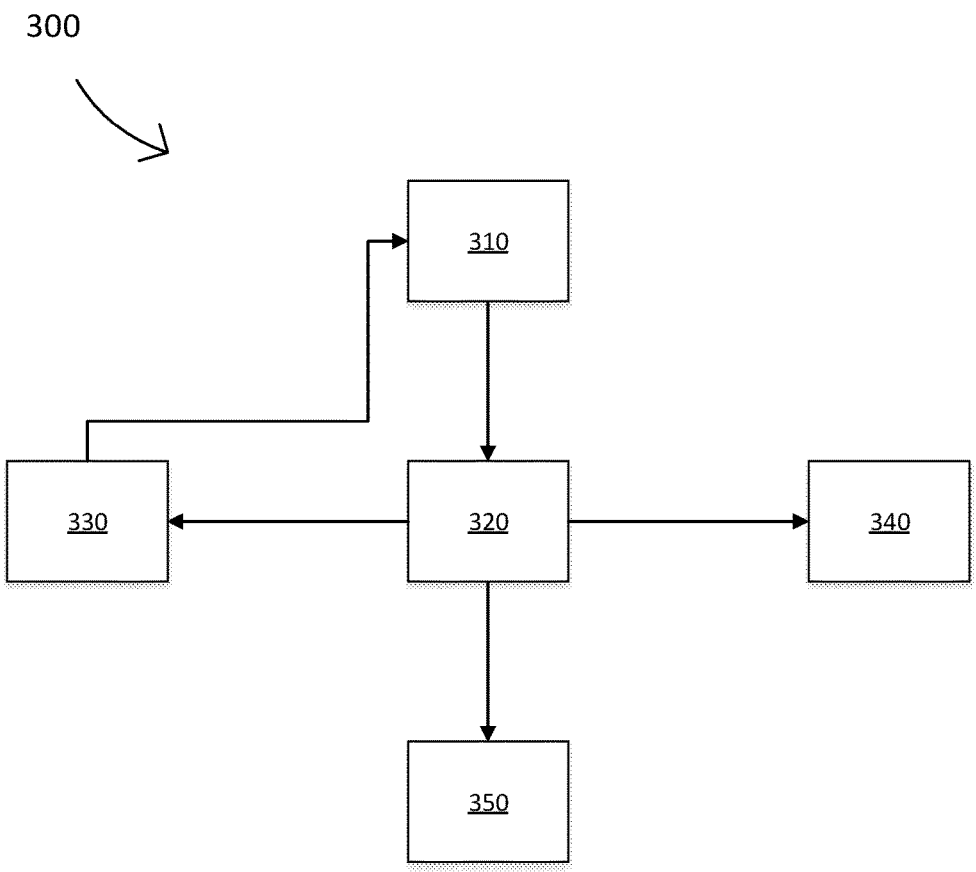
FIG. 3 is a flow chart depicting a method of determining a functional state of a braking system, according to an exemplary embodiment of the present teachings.

Turning to FIG. 3, a braking method 300 is shown for an exemplary embodiment in which the functional state of a primary braking system is determined. In a first step 310, information may be received about the functional state of a primary braking system. For example, a controller may monitor a functional status of the braking system of vehicle 10 in FIGS. 1 and 2, including pressure source 22, primary pressure supply valves 24 and 26, and/or wheel inlet valves 13, 15, 17, 19. In step 320, the functional state of the primary braking system 30 may be determined based on the information received in step 310, such as to determine whether primary braking system 30 is fully functional, partially functional, or fully non-functional.

If the primary braking system is fully functional, the method may proceed to step 330, in which the braking system is used according to normal operating conditions, for example, as represented in exemplary FIG. 1. The method may proceed from step 330 to step 310 to repeat the overall braking method 300 on a periodic basis. If it is determined in step 320 that the primary braking system is fully non-functional, the method 300 proceeds to step 350, in which a transition to a fallback braking mode occurs according to the exemplary embodiments described herein in which the primary braking system is fully non-functional. If it is determined in step 320 that the primary braking system is partially functional, the method 300 proceeds to step 340, in which a transition to a fallback braking mode occurs according to the exemplary embodiments described herein in which the primary braking system is partially functional.

As discussed above, when the primary braking system 30 is partially functional (e.g., the ability to boost brakes is lost), proceeding from step 340 of method 300, the controller 20 may initiate, a transition to a fallback braking mode in which the working volume of the braking system is reduced such that hydraulic fluid pressure is supplied to fewer than all of the wheels of vehicle 10. For example, controller 20 may supply hydraulic fluid to braking devices of only two wheels of vehicle 10 (e.g., wheels of a single axle), such as front wheels 12 and 14, but not rear wheels 16 and 18. Thus, the braking power of the hydraulic fluid pressure is focused on front wheels 12 and 14. Parking brake system 60 may be used to brake rear wheels 16 and 18.

Figure 4:
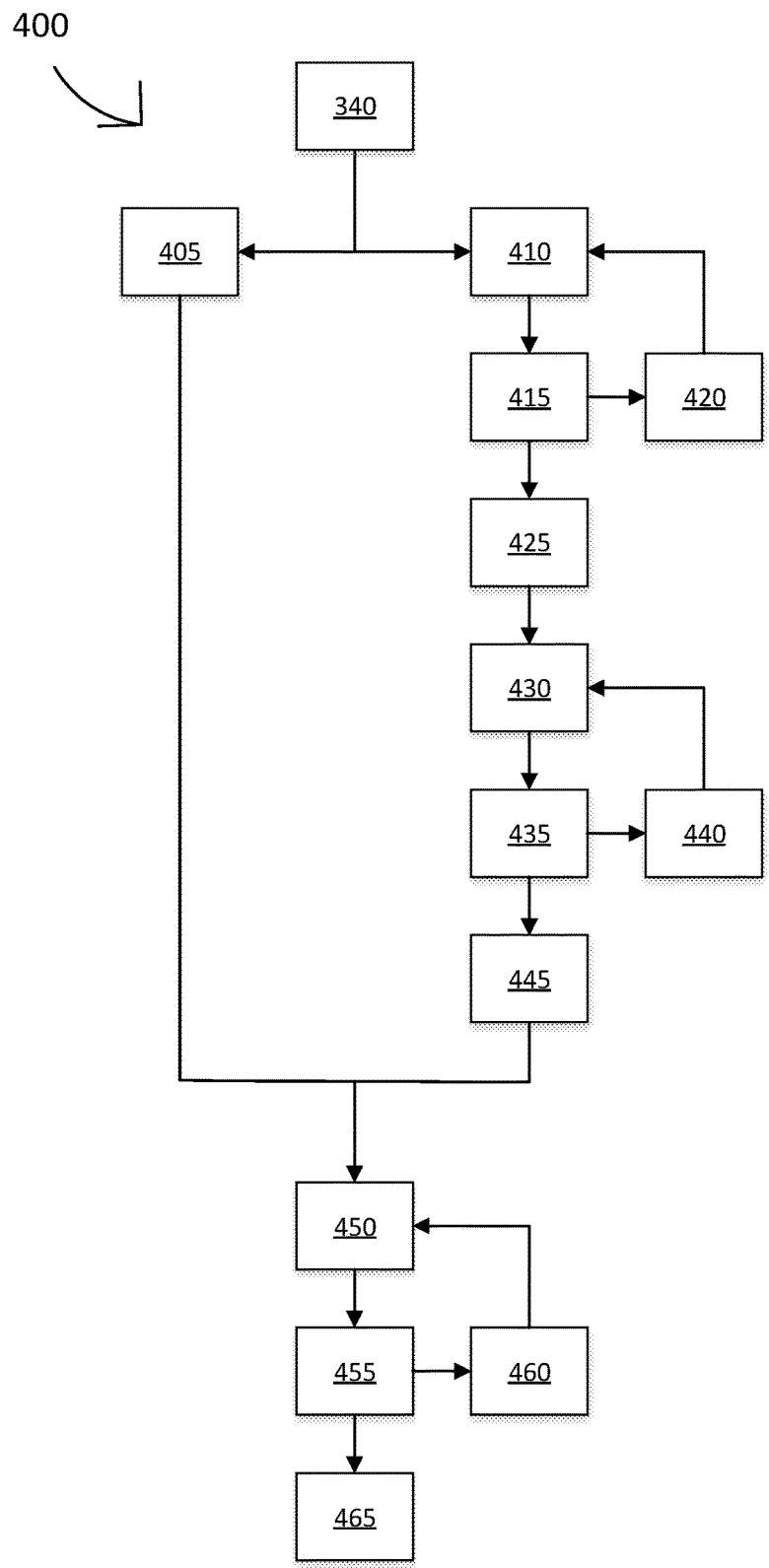
FIG. 4 is a flow chart depicting a first exemplary method of transitioning to a fallback braking mode, according to an exemplary embodiment of the present teachings.

Turning to FIG. 4, an exemplary method 400 to transition to a fallback braking mode once the primary braking system has been determined to be partially functional at step 340 of method 300 is shown. At step 405, the brake controller may close rear wheel inlet valves and/or a primary pressure supply valve to reduce the working volume of the hydraulic braking system such that hydraulic fluid pressure is supplied to only to the front wheels of the vehicle. At step 410, which can optionally occur concurrently with step 405, information may be received about the amount of force being applied to the brake pedal by the driver. For example, force information can be detected and/or approximated by a pedal travel sensor, a pedal angle sensor, an ABS unit pressure sensor, a two-stage brake on-off switch, or any other method for sensing a driver's intent for braking, and then communicated to the controller. In step 415, the amount of force being applied to the brake pedal by the driver may be determined based on the information received in step 410 in order to determine whether the parking brake system 60 should be actuated to supply braking energy to the rear wheels.

If the amount of force being applied to the brake pedal by the driver is determined to be below a specified threshold level of force, the method may proceed to step 420, in which the parking brake system is not actuated to supply braking energy to the rear wheels of the vehicle. Then the method may proceed from step 420 to step 410 to repeatedly determine whether to actuate the parking brake system to supply braking energy to the rear wheels on a periodic basis. If the amount of force being applied to the brake pedal by the driver is determined to meet or exceed a specified threshold level of force, the method may proceed to step 425, in which actuation of the parking brake system to supply braking energy to the rear wheels of the vehicle is begun. To begin actuation of the parking brake system to supply braking energy to the rear wheels, the method may proceed to step 430, in which information may be received regarding the speed of the vehicle. For example, speed information can be detected and/or approximated by a speedometer and then communicated to the controller. In step 435, how to actuate the parking brake to supply braking energy to the rear wheels may be determined based on the information received in step 430.

Where, as described above, the parking brake system is an electronic parking brake system, and vehicle speed is determined to be above a specified threshold level of speed, the method may proceed to step 440, in which the electronic parking brake is actuated and controlled to use ABS while supplying braking energy to the rear wheels as described above. An electronic parking brake actuated and controlled to use ABS cycles to a pre-defined load and then releases the load (regardless of whether wheel slip has occurred or not). The duty cycle of the on/off application of the load may be varied based on the force being applied to the brake pedal and/or vehicle speed. The method may proceed from step 440 to step 430 to repeatedly determine how to actuate the parking brake to supply braking energy to the rear wheels. If vehicle speed is determined to be at or below a specified threshold level of speed, the method may proceed to step 445, in which electronic parking brake is actuated and supplies braking energy to the rear wheels via dynamic clamping in a slip dependent manner. A slip dependent manner means that when the electronic parking brake is clamped, it will engage the wheel up to a rear slip threshold where wheel slip occurs, then release the wheel. The rear slip threshold may vary, for example, according to the percentage of deviation from vehicle speed or an amount of reduction per unit time relative to previous wheel rotation speeds.

Steps 410 through 445 can occur concurrently with or after the working volume of the hydraulic braking system is reduced such that hydraulic fluid pressure is supplied to only to the front wheels of the vehicle at step 405. Once the working volume of the hydraulic braking system has been reduced at step 405 and the electronic parking brake has been actuated to supply braking energy to the rear wheels via dynamic clamping in a slip dependent manner at step 445, the method may proceed to step 450, in which information may be received about whether or not the vehicle is at a standstill. For example, vehicle speed and/or standstill information can be detected or approximated by a speedometer, GPS, a sensor operably connected to the power train (e.g., in the transmission or electric motor drive), or any other method for sensing a vehicle's motion, and then communicated to the brake controller. In step 455, it may be determined whether or not the vehicle is at a standstill based on the information received in step 450 in order to bring the braking system into the final fallback braking mode.

If it is determined in step 455 that the vehicle is not at a standstill, the method 400 proceeds to step 460, in which the working volume of the hydraulic braking system is maintained at a reduced volume and the electronic parking brake remains actuated to supply braking energy to the rear wheels via dynamic clamping in a slip dependent manner. The method may proceed from step 460 to step 450 to repeatedly determine whether to bring the braking system into the final fallback braking mode on a periodic basis. If it is determined that the vehicle is at a standstill, the method may proceed to step 465, in which the braking system is brought into the final fallback braking mode. To bring the system into the fallback braking mode, the controller may reopen the rear wheel inlet valves and/or a primary pressure supply valve in order to increase the working volume of the hydraulic braking system such that hydraulic fluid pressure is supplied to all of the wheels of the vehicle (i.e., both the front and the rear wheels). Also, in bringing the system into the fallback braking mode, the parking brake may be removed from engagement with the rear wheels. After removing the parking brake from engagement with the rear wheels, a driver can maintain the vehicle stationary in the fallback braking mode by depressing the brake pedal so as to supply hydraulic fluid pressure is supplied to all of the wheels of the vehicle, which is effective to brake the vehicle once it has been brought a speed at or near standstill.

A primary braking system may become fully non-functional when the ability to provide any hydraulic fluid pressure to the foundation brakes is lost completely. The ability to provide any hydraulic fluid pressure to the foundation brakes may be lost, for example, because of a brake controller failure or because of a complete loss of the hydraulic braking fluid. When the primary braking system is fully non-functional, proceeding from step 350 of method 300 (see FIG. 3), the controller 20 may initiate, a transition to a fallback braking mode in which the working volume of the braking system is reduced such that hydraulic fluid pressure is supplied to fewer than all of the wheels of vehicle 10. For example, controller 20 may supply hydraulic fluid to braking devices of only two wheels of vehicle 10 (i.e., wheels of a single axle), such as front wheels 12 and 14, but not rear wheels 16 and 18. Thus, the braking power of the hydraulic fluid pressure is focused on front wheels 12 and 14. Parking brake system 60 may be used to brake rear wheels 16 and 18. Further, additional methods of applying dynamic braking torque may be applied during a transition to a fallback braking mode.

Figure 5:
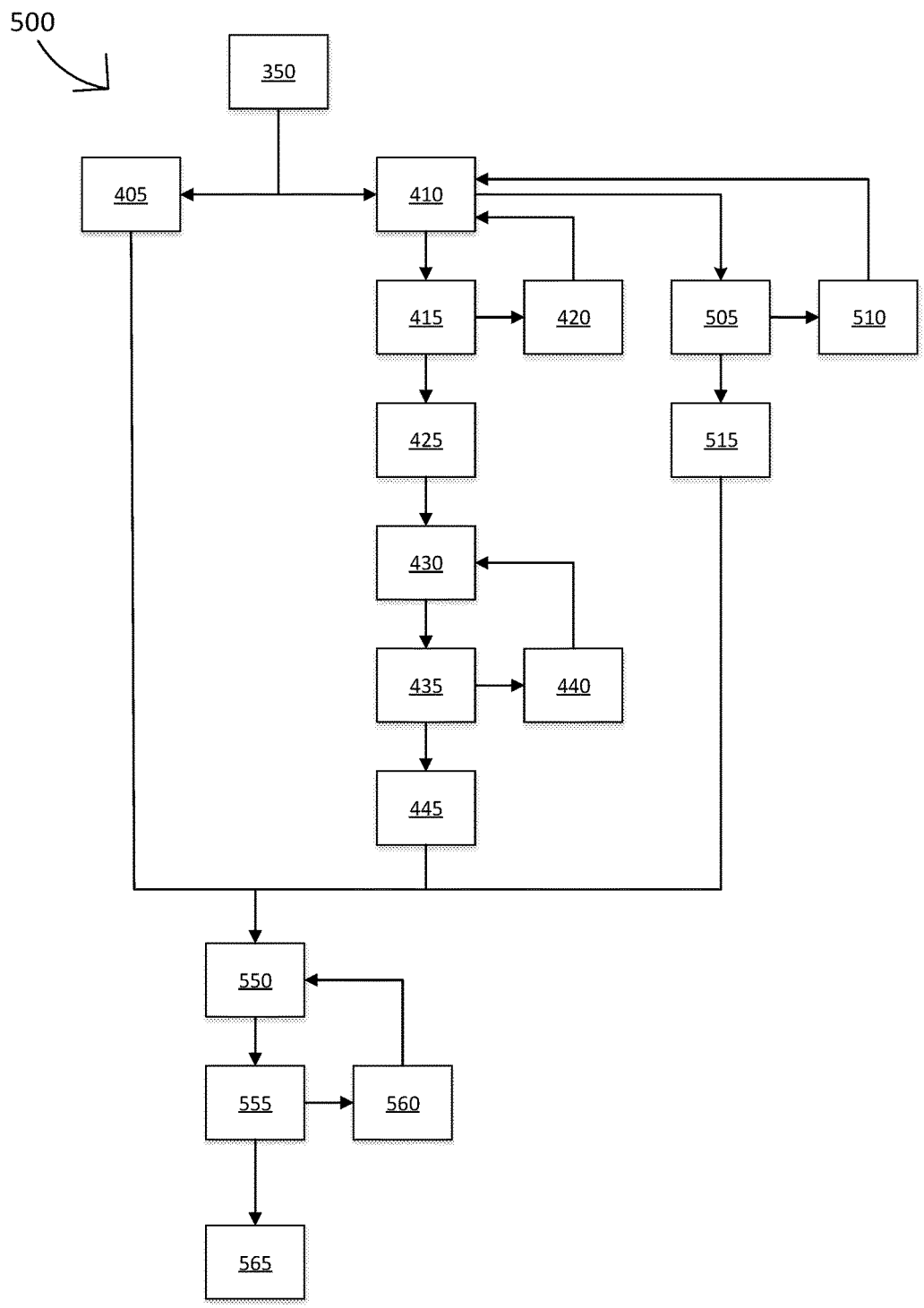
FIG. 5 is a flow chart depicting a second exemplary method of transitioning to a fallback braking mode, according to another exemplary embodiment of the present teachings.

Turning to FIG. 5, an exemplary method 500 to transition to a fallback braking mode once the primary braking system has been determined to be fully non-functional functional at step 350 of method 300 is shown. Method 500 includes the same steps 405-445 that are included in method 400 (to transition to a fallback braking mode once the primary braking system has been determined to be partially functional and are described above. However, additional steps are included in method 500 so that additional methods of applying dynamic braking torque can be applied during a transition to a fallback braking mode.

At step 410 of method 500, information may be received about the amount of force being applied to the brake pedal by the driver. For example, force information can be detected and/or approximated by a pedal travel sensor, a pedal angle sensor, an ABS unit pressure sensor, or any other method for sensing a driver's intent for braking, and then communicated to the brake controller. Similar to method 400, in step 415 of method 500, the amount of force being applied to the brake pedal by the driver may be determined based on the information received in step 410 in order to determine whether the parking brake system 60 should be actuated to supply braking energy to the rear wheels. Further, in step 505 of method 500, the amount of force being applied to the brake pedal by the driver may be determined based on the information received in step 410 in order to determine whether actuate additional methods of supplying dynamic braking torque to the vehicle. Additional methods of applying dynamic counter-propulsive torque can include engine braking methods, transmission braking methods, and methods of adding engine loads.

Engine braking methods can include spark retarding and/or engine valve closure. Spark retarding and engine valve closure inhibit combustion such that engine pistons fail to turn the wheels. Engine valve closure increases the resistance to turning the pistons beyond the normal resistance due to friction.

Transmission braking can be initiated by downshifting a vehicle with an automatic transmission or actuating a low gear in a vehicle with a shift-by-wire transmission. Shifting to a gear with a lower gear ratio reduces that speed at which the engine can rotate and provides counterpropulsive force by limiting the rotational speed. Transmission braking can have increased influence when coupled with engine braking methods disclosed above.

Engine loads may be added by engaging the air conditioning of a vehicle, raising the alternator set point voltage, and/or any other loads operably connected to belts connected to the engine. Increasing engine loads requires more of the torque generated by the engine to be diverted to provide energy for operating the engine loads instead of providing propulsive energy to the wheels.

Referring again to the method 500 of FIG. 5, if the amount of force being applied to the brake pedal by the driver is determined to be below a specified threshold level of force, the method may proceed to step 510, in which at least one of the additional methods of applying dynamic counter-propulsive torque (i.e., engine braking, transmission braking, and adding engine loads) are not actuated to supply braking energy to the rear wheels of the vehicle. The method may proceed from step 510 to step 410 to repeatedly determine whether to actuate each of the additional methods of applying dynamic counter-propulsive torque on a periodic basis. If the amount of force being applied to the brake pedal by the driver is determined to meet or exceed a specified threshold level of force, the method may proceed to step 515, in which actuation of the one or more of the additional methods of applying dynamic braking torque occurs. Each type of the additional methods of applying dynamic counter-propulsive torque (i.e., engine braking, transmission braking, and adding engine loads) can have a unique specified threshold level of force that triggers actuation of the method at step 515. In other words, threshold levels of force for each additional method of applying dynamic counter-propulsive torque may be staggered such that as the amount of force applied to the brake pedal increases, the amount of additional methods of applying dynamic counter-propulsive torque that are actuated increases. Actuation of the additional methods of applying dynamic counter-propulsive torque in this way can provide the driver a more familiar brake pedal feel during a transition to a fallback braking mode and smooth out the feel of the overall transition.

Steps 505 through 515 may occur concurrently with or after the working volume of the hydraulic braking system is reduced such that hydraulic fluid pressure is supplied to only to the front wheels of the vehicle at step 405. Also, steps 505 through 515 may occur concurrently with the actuation and modulation of the parking brake system at steps 410 through 445. Once the working volume of the hydraulic braking system has been reduced at step 405, the electronic parking brake has been actuated to supply braking energy to the rear wheels via dynamic clamping in a slip dependent manner at step 445, and all of the additional methods of applying dynamic counter-propulsive torque have been actuated at step 515, the method may proceed to step 550, in which information may be received about whether or not the vehicle is at a standstill may be received. For example, vehicle speed and/or standstill information can be detected or approximated by a speedometer, GPS, a sensor operably connected to the power train (e.g., in the transmission or electric motor drive), or any other method for sensing a vehicle's motion, and then communicated to the brake controller. In step 555, it may be determined whether or not the vehicle is at a standstill based on the information received in step 550 in order to bring the braking system into the final fallback braking mode.

If it is determined in step 555 that the vehicle is not at a standstill, the method 500 proceeds to step 560, in which the working volume of the hydraulic braking system is maintained at a reduced volume, the electronic parking brake remains actuated to supply braking energy to the rear wheels via dynamic clamping in a slip dependent manner, and the additional methods of applying dynamic counter-propulsive torque remain actuated. The method may proceed from step 560 to step 550 to repeatedly determine whether to bring the braking system into the final fallback braking mode on a periodic basis. If it is determined that the vehicle is at a standstill, the method may proceed to step 565, in which the braking system is brought into the final fallback braking mode. To bring the system into the fallback braking mode the brake controller may reopen the rear wheel inlet valves and/or a primary pressure supply valve in order to increase the working volume of the hydraulic braking system such that any remaining hydraulic fluid pressure is supplied to all of the wheels of the vehicle (i.e., both the front and the rear wheels). Also, in bringing the system into the fallback braking mode, the parking brake may be removed from engagement with the rear wheels. Further, in bringing the system into the fallback braking mode, the additional methods of applying dynamic braking force may be disengaged.

Figure 6:
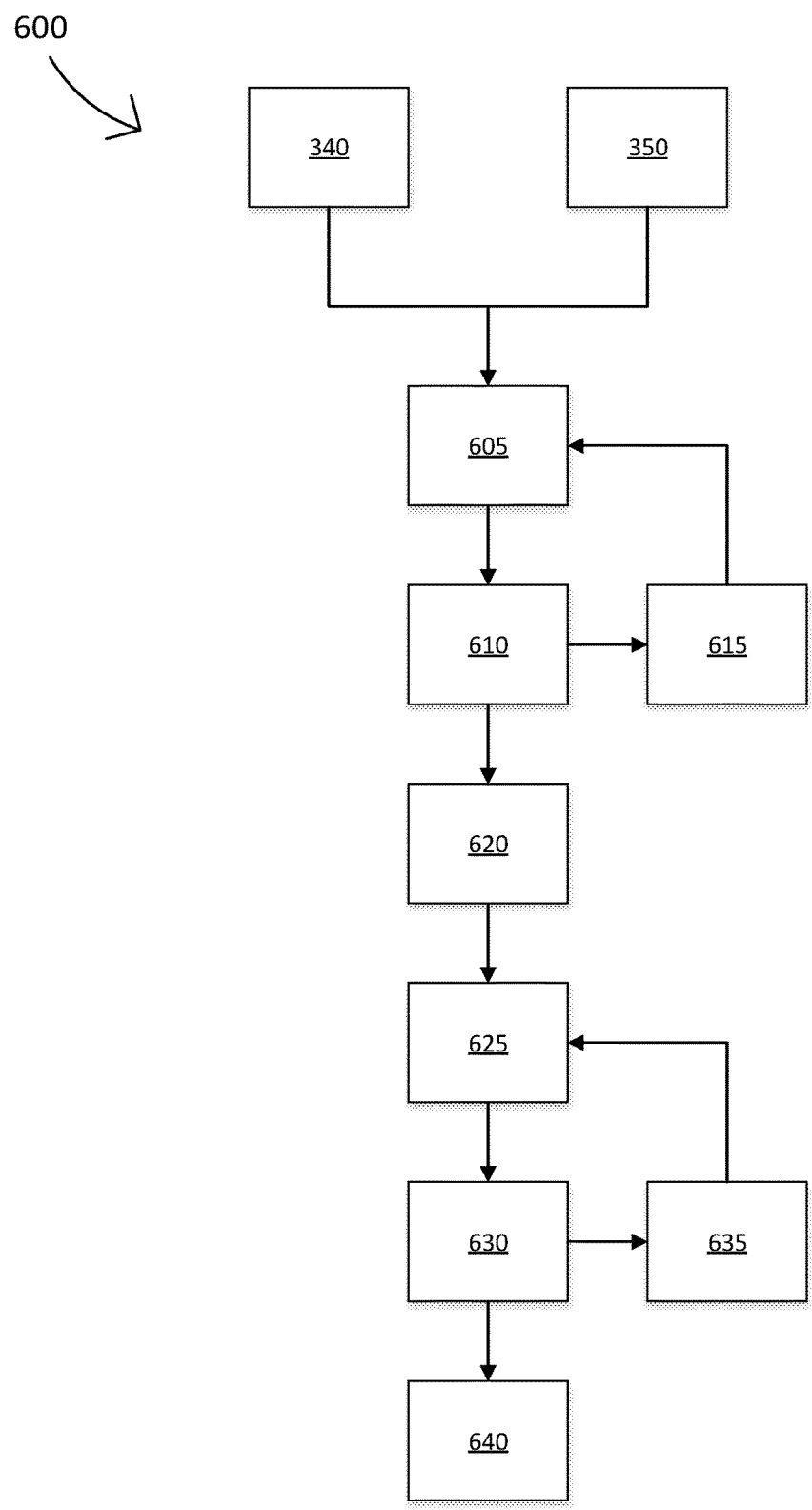
FIG. 6 is a flow chart depicting a third exemplary method of transitioning to a fallback braking mode, according to yet another exemplary embodiment of the present teachings.

Another type of failure that can occur in the overall braking system is a failure of the braking devices (e.g., the braking devices (not shown) at the wheels 12, 14, 16, 18 of vehicle 10 in FIGS. 1 and 2). Turning to FIG. 6, an exemplary method 600 may run concurrently with either of previously described methods 400 or 500 to transition to a fallback braking mode once the primary braking system has been determined to be partially functional or fully non-functional functional at steps 340 or 350, respectively, of method 300 is shown. Method 600 is applicable for vehicles with a shift-by-wire system. Shift-by-wire vehicles that incorporate method 600 can apply counter-propulsive torque to the wheels of the vehicle by shifting the vehicle into reverse or park.

At step 605 of method 600, information may be received about the functionality of the braking devices at the wheels may be received. For example, braking device functionality information can be detected by a braking device sensor or any other method for the availability of the braking devices, and then communicated to the controller. If it is determined in step 610 that the braking devices at the wheels are functional, the method 600 proceeds to step 615, in which the shift to reverse or park is not initiated. The method may proceed from step 615 to step 610 to repeatedly determine whether the braking devices at the wheels are functional on a periodic basis. If it is determined that the braking devices at the wheels are non-functional, the method may proceed to step 620, in which additional aspects are monitored, such as the brake pedal travel and speed of the vehicle, to determine whether a shift to reverse or park will be initiated during a transition to a fallback braking mode.

Once step 620 is reached, where the foundation brakes are indicated to be non-functional, method 600 may proceed to step 625, in which information about the force being applied to the brake pedal and information about the speed of the vehicle may be received. For example, force information can be detected and/or approximated by a pedal travel sensor, a pedal angle sensor, an ABS unit pressure sensor, or any other suitable method for sensing a driver's intent for braking, and vehicle speed information can be detected and/or approximated by a speedometer. Both pedal force information and vehicle speed information can then communicated to the brake controller. Once the information is communicated, method 600 may proceed to step 630. At step 630 the amount of force being applied to the brake pedal by the driver and the speed of the vehicle may be determined based on the information received in step 625 in order to determine whether to shift the vehicle into reverse or park, or to delay such a shift. If the amount of force being applied to the brake pedal by the driver is determined to be below a specified threshold level of force and/or the speed of the vehicle is determined to be above specified threshold level of speed, then the method may proceed to step 635, in which use of the shift-by-wire capability of the vehicle to shift the vehicle into reverse or park is delayed. The method may proceed from step 635 to step 625 to repeatedly determine whether to shift the vehicle into reverse or park. If both the amount of force being applied to the brake pedal by the driver is determined to meet or exceed a specified threshold level of force and the speed of the vehicle is determined to be at or below a specified threshold level of speed, the method may proceed to step 640, in which the shift-by-wire capability of the vehicle is used to shift the vehicle into reverse or park. An exemplary threshold level of force may be an amount required to achieve maximum brake pedal travel possible, although other threshold levels of force are contemplated. An exemplary threshold level of speed may be about 20 kilometers per hour (kph) or less, or about 5 kph or less. In other words, if it is determined that the brake pedal is fully applied (i.e., amount of force being applied is sufficient to achieve full pedal travel) and the speed of the vehicle has been sufficiently lowered (e.g., vehicle speed is below about 20 kph or below about 5 kph), then the vehicle is shifted into reverse or park. In general, threshold levels of force and/or speed can be calibrated. Once a vehicle is at a standstill (i.e., when the vehicle is determined to be at a standstill at step 460 or 560 of concurrently processing methods 400 or 500, respectively), the brake-by-wire system of the vehicle can be shifted out of reverse or park so that the braking system may be brought to a final fallback mode of braking.

According to an alternative exemplary embodiment where a vehicle can be shifted into reverse, a speed threshold may not be required to shift the vehicle into reverse. According to another exemplary embodiment an embodiment where the vehicle is shifted into park, the park pawl of the vehicle may be applied to shift into park. Where the vehicle is shifted into park by applying the park pawl, a speed threshold is required due to the pawl ratcheting effect.

It is to be understood that the particular examples and embodiments set forth herein are non-limiting, and modifications to structure, dimensions, materials, and methodologies may be made without departing from the scope of the present teachings.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the devices and methods of the present disclosure without departing from the scope of its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A method for transitioning a braking system between primary and fallback modes, comprising:
   reducing a working volume of a primary braking system so that hydraulic braking energy is supplied to wheels of a single axle of a vehicle;
   monitoring a speed of the vehicle;
   supplying braking energy by an electronic parking brake by cycling the electronic parking brake to a predefined load and releasing the load regardless of whether wheel slip has occurred when the speed of the vehicle is above a threshold speed, and
   supplying braking energy by the electronic parking brake by engaging the electronic parking brake up to a slip threshold where wheel slip occurs when the speed of the vehicle is at or below a threshold speed.

2. The method of claim 1, wherein monitoring the speed of the vehicle comprises periodically determining the speed of the vehicle.

3. The method of claim 1, further comprising:
periodically determining whether the vehicle is at a standstill; and
after it has been determined that the vehicle is at a standstill, bringing the braking system of the vehicle into the fallback braking mode.

4. The method of claim 1, wherein the electronic parking brake supplies energy in an amount proportional to an amount of brake pedal depression by a driver of the vehicle.

5. The method of claim 1, further comprising:
actuating at least one additional method of applying dynamic counter-propulsive torque to the vehicle selected from the group consisting of an engine braking method, a transmission braking method, and an adding engine load method.

6. The method of claim 5, wherein the engine braking method includes spark retarding or engine valve closure.

7. The method of claim 5, wherein the vehicle comprises an automatic transmission, and the transmission braking method includes downshifting the automatic transmission.

8. The method of claim 5, wherein the vehicle comprises a shift-by-wire transmission, and the transmission braking method includes actuating a lower gear.

9. The method of claim 5, wherein the adding engine load method includes engaging an air conditioning system of the vehicle or raising an alternator set point voltage of the vehicle.

10. The method of claim 5, further comprising periodically determining a functional state of the primary braking system of the vehicle, wherein performing the step of actuating at least one additional method of applying dynamic counter-propulsive torque to the vehicle occurs after the functional state of the primary braking system has been determined to be fully non-functional.

11. The method of claim 5, further comprising periodically determining an amount of force applied to a brake pedal by a driver of the vehicle, wherein the amount of braking energy supplied by the at least one additional method of applying dynamic counter-propulsive torque to the vehicle is proportional to the determined amount of force applied to the brake pedal by the driver of the vehicle.

12. The method of claim 1, further comprising applying counter-propulsive force to the vehicle by using a shift-by-wire system to shift the vehicle into reverse or park.

13. The method of claim 12, wherein the vehicle comprises a braking device for each wheel of the vehicle, the method further comprising periodically determining a functional state of each braking device, and wherein performing the step of using a shift-by-wire system to shift the vehicle into reverse or park occurs after the functional state of at least one braking device has been determined to be non-functional.

14. The method of claim 13, wherein after the functional state of at least one braking device has been determined to be non-functional, the method further comprises periodically determining the speed of the vehicle and periodically determining whether a brake pedal is fully depressed by a driver of the vehicle, and wherein performing the step of using a shift-by-wire system to shift the vehicle into reverse or park occurs when both the vehicle speed has been determined to be at or below a threshold level of speed and the brake pedal has been determined to be fully depressed by the driver of the vehicle.

15. The method of claim 14, wherein the threshold level of speed is about 20 kph or less.

16. The method of claim 14, wherein the threshold level of speed is about 5 kph or less.

17. The method of claim 12, further comprising applying counter-propulsive force to the vehicle by using a shift-by-wire system to shift the vehicle into reverse.

18. The method of claim 12, further comprising applying counter-propulsive force to the vehicle by using a shift-by-wire system to shift the vehicle into park.

19. The method of claim 1, wherein reducing a working volume of the primary braking system occurs in response to a sensed reduction in braking performance in the primary braking mode.

20. The method of claim 1, further comprising switching from supplying braking energy by an electronic parking brake by cycling the electronic parking brake to a predefined load and releasing the load regardless of whether wheel slip has occurred to supplying braking energy by engaging the electronic parking brake up to a slip threshold where wheel slip occurs when the speed of the vehicle falls to or below the threshold speed.

21. A method for transitioning a braking system between primary and fallback modes, comprising:
reducing a working volume of a primary braking system so that hydraulic braking energy is supplied to wheels of a single axle of a vehicle;
monitoring a speed of the vehicle;
supplying braking energy by an electronic parking brake by cycling the electronic parking brake to a predefined load and releasing the load regardless of whether wheel slip has occurred when the speed of the vehicle is above a threshold speed, and
supplying braking energy by the electronic parking brake by engaging the electronic parking brake up to a slip threshold where wheel slip occurs when the speed of the vehicle is at or below a threshold speed;
periodically determining whether the vehicle is at a standstill; and
after it has been determined that the vehicle is at a standstill, bringing the braking system of the vehicle into the fallback braking mode by increasing the working volume of the primary braking system so that hydraulic braking energy is supplied to all wheels of the vehicle.

* * * * *